MONTMORILLONITE CLAYS AS AIDS IN STEAM DISTILLATION OF TETRAALKYLLEAD

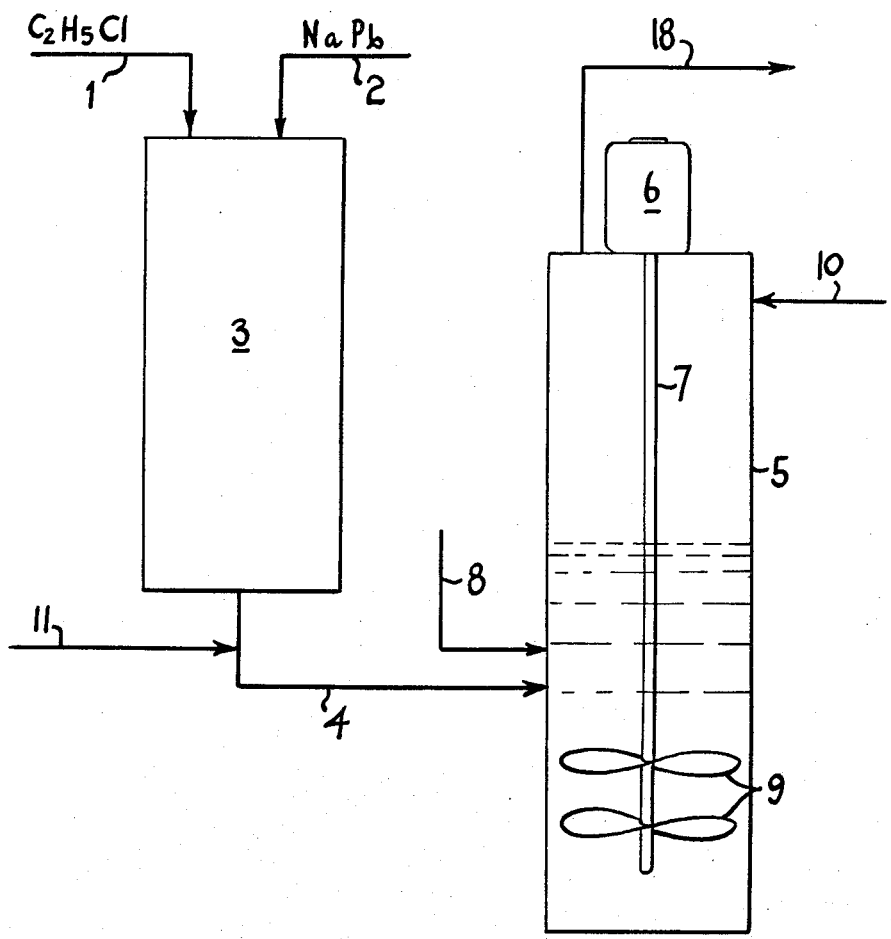

Thorowgood T. Broun, Jr., Beaumont, Tex., assignor to PPG Industries, Inc., Pittsburgh, Pa.
Filed July 2, 1970, Ser. No. 51,776
Int. Cl. B01d 3/38
U.S. Cl. 203—50
11 Claims

ABSTRACT OF THE DISCLOSURE

A method of dispersing lead particulates present in a reaction mass undergoing steam distillation is described. In particular the reaction mass contains tetraalkylleads, solid lead particulates, sodium halides and water. This mass is subjected to steam distillation and controlled during distillation to maintain therein a montmorillonite clay in quantities representing at least 0.0001 pound of clay per pound of lead particles present. Clays of particular note mentioned in the specification are bentonite clays and fuller's earth.

BACKGROUND OF THE INVENTION

In the conventional manufacture of tetraethyllead, the process may be illustrated by the following equation:

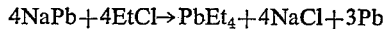

$$4NaPb + 4EtCl \rightarrow PbEt_4 + 4NaCl + 3Pb$$

As can be readily seen from the above equation, the reaction produces metallic lead, sodium chloride and tetraethyllead. Conventionally, there is also present unreacted, excess ethyl chloride. A similar situation occurs when other alkyl halides are substituted for the ethyl chloride shown in the above equation or when mixed alkyl halides are employed. In these instances a sodium-lead alloy is reacted with an alkyl halide such as methyl halide or with a mixed alkyl halide. These produce alkyl lead compounds corresponding to the mixed alkyl halide or the alkyl halide used. In the recovery of the alkyl lead compounds from this reaction the reaction masses are typically dropped into a vessel in which they are mixed with water and subjected to steam distillation. The alkyl lead compound is removed as overhead during the steam distillation as is any excess alkyl halide present.

During this distillation lead, which was originally present as fine particulates, tends to agglomerate to an uncontrollable extent in the distillation vessel unless some special precautions are taken to avoid this. In general, to avoid this agglomeration the steam still utilized are vessels provided with mechanical agitation. It also has been customary in the prior art to employ various still aids such as chromate and dichromate compounds of sodium, sodium thiosulfate and ferric chlorides. Green ferrous sulfate heptahydrate is a particularly useful compound for this purpose and is used in conjunction typically with sodium thiosulfate.

The literature reports that the size of lead particles formed in the distillation of these reaction masses often decreases as the amount of still aid used is increased. This phenomenon frequently produces lead particles of such small size (100 mesh or smaller), in the stills and in undesirable quantities (usually 20 percent or more of all lead present), that considerable difficulty is encountered when the lead particles recovered from the steam still are processed for lead recovery in recovery furnaces. In this latter connection, note the discussion in U.S. Pat. 2,723,227, column 1, lines 68–72 and column 2, lines 1–13. Still further, considerable quantities of these still aid chemicals are often required to accomplish adequate dispersion of lead in the steam stills.

THE PRESENT INVENTION

It has now been discovered that, by the utilization of montomorillonite clays as steam still aids during the steam distillation of reaction masses containing tetraalkylleads, alkyl halides and fine particulate lead, the lead can be easily dispersed during the steam distillation and many advantages obtained over distillation using the conventional prior art chemicals. The clay employed is used typically in quantities representing at least 0.0001 pound of clay per pound of lead present in the still. Thus, by virtue of the instant invention the quantity of still aid material added to a reaction mass undergoing steam distillation can be considerably reduced using clay in lieu of the conventional materials. It has also been found that the quantity of fine lead particles produced during steam distillation is considerably reduced using montmorillonite clays as a still aid instead of the conventional sodium thiosulfate and copperas.

In practicing the instant invention the montmorillonite clays of particular note are those present in the montmorillonite minerals such as montmorillonite, beidellite, nontronite, hectorite, saponite and sauconite. These minerals are the principal constituents of the group of clays classified generally as bentonite clays. A discussion of these minerals and typical formulas is given on page 547, volume 5 of "Encyclopedia of Chemical Technology," Kirk-Othmer, 1964.

In preparing clay for addition to steam stills in accordance with the instant invention, the clay may be added in the dry form or it can be added as a suspension in aqueous solution without detracting from the process in any way. Thus, additions can be made to the steam still when a charge from a tetraalkyllead autoclave is dropped into the steam still with water or the clay may be added with the water when water is mixed with the reaction mass discharged from a tetraalkyllead autoclave.

When steam distillation is begun, sufficient clay should be present in the still to provide on a continuing basis during the distillation a clay content of at least 0.0001 pound of clay per pound of lead present in the reactor or steam still. In general the quantity of clay present ranges between 0.0001 and about .01 pound of clay per pound of lead present in the still. The addition of clay, as opposed to the chemicals utilized prior to this discovery, does not appear to be lead sensitive as regards quantity. Thus, fine particles of lead are not produced when large quantities of clay are employed as they often are with conventional still aids. Thus, there does not appear to be any criticality with respect to the use of large quantities of clay if this is desired. Therefore, quantities considerably above 0.01 pound of clay per pound of lead can be used in the stills without seriously detracting from the efficacy of the clay as a dispersing agent for the particulate lead present. For this reason the utilization of bentonite clays as described in the instant specification leads to steam still operations that do not produce inordinate quantities of fine particulate lead. The nonappearance of fine particulate lead in steam still discharges simplifies considerably the operation of sludge pits and furnaces in a tetraalkyllead plant in which particulate lead is recovered from steam still discharges.

For a more complete understanding of the instant invention, reference is made to the accompanying drawing which shows diagrammatically the application of the instant process to a tetraethyllead plant in which tetraethyllead is being produced from sodium-lead alloy and ethyl chloride.

As shown in the drawing, sodium-lead alloy and ethyl chloride are introduced into an autoclave 3 via lines 2 and 1, respectively. Typically in the operation of this autoclave 3, the ethyl chloride and sodium-lead alloy react to produce tetraethyllead and sodium chloride. In general excess quantities of ethyl chloride are employed in the reaction zone in autoclave 3. The reaction may take place in the presence of a material such as diethyl ether which is often used for the purpose of suppressing the formation of dilead compounds that are undesirable in the tetraethyllead reaction. Upon completion of the reaction, the reaction mass contained in the vessel 3 is removed through line 4 and passed to a steam still 5. This still normally is fitted with a drive shaft 7 having paddles attached thereto and driven by a motor 6. The paddles 9 agitate the contents of the vessel 5 during distillation. The steam still 5 is also equipped with a steam line 8 for the introduction of steam to the vessel and an overhead vapor line 18 through which tetraethyllead product is removed as a vapor.

In accordance with the teaching of the instant invention, bentonite clay is added to the vessel through line 10 either as a dry clay or as a clay slurry in water. Line 4 is provided with a line 11 for the introduction of water to the reaction mass recovered from the reactor 3.

Thus, as can be readily seen from the operation of the equipment diagrammatically illustrated in the figure, the reaction charge from the autoclave 3 is introduced via line 4 into the steam still 5 after contact with water entering line 4 through line 11. Clay additions may be made through line 10 as shown in the drawing or through line 11 with the water contacting the charges from autoclave 3 as desired. Steam is admitted to the still vessel 5 via line 8 to distill the tetraalkyllead from the water and the particulate lead contained in the charge leaving vessel 3 and entering still 5.

The additions of clay through lines 10 or 11 or both are maintained such that the quantity of clay in the vessel 5 is maintained in a quantity of at least 0.0001 pound of clay per pound of lead present in the vessel. This quantity of clay insures adequate dispersion of the lead particles without any deleterious results occurring. Production of large quantities of lead fines in the vessel is also avoided during the distillation procedure.

Distillations contemplated by the instant invention in vessel 5 takes place typically at pressures of 20 to 60 millimeters of mercury and typically at temperatures ranging between 214° F. and 220° F.

When a slurry of clay is employed in lines 10 or 11 to supply the clay content for the still charge, the slurry typically contains 5 to 15 percent by weight, clay basis the weight of the slurry. Slurry addition forms the preferred mode of adding clay to the still charge. While the clay content of the still is generally 0.0001 to 0.01 pound per pound of lead present, greater quantities may be employed. Preferably the clay content is maintained between 0.001 and 0.01 pound per pound of lead present.

The following examples illustrate the practice of the instant invention in a laboratory steam still used to distill a tetraethyllead charge from a laboratory autoclave.

Example I 168 grams of monosodium lead alloy and 225 grams of ethyl chloride containing 0.1 percent acetone were reacted in a stainless steel laboratory autoclave at 85° C. for 60 minutes. The temperature of the charge of the reaction was reduced to 0 to 10° C.

A charge of 185 milliliters of water was added to a laboratory still pot equipped with agitators. Unreacted ethyl chloride was vented from the autoclave into the still pot. After this venting, the reaction mass from the autoclave was transferred to the still pot and contacted with the water therein. The clay additions to the still pot were then made. The pot was then closed, the agitator was started and heat was applied to the pot. As the boiling point of the water solution in the pot was approached, steam flow to the still was started. After 30 minutes of steam distillation, 8.4 milliliters of 3 percent tall oil soap solution was added. Distillation was continued for 30 more minutes and then shut down. Several runs were made under these conditions and the final lead sludge obtained for each run was screened to show particle size distribution as a function of clay effectiveness in preventing agglomeration. The results of these runs are shown in Table I.

TABLE I

| Run No. | Still aid | | Screen analysis (U.S. sieve)—Final lead sludge, cumulative, percent retained on screen of— | | |
|---|---|---|---|---|---|
| | Anhydrous wt. per 100 wt. sludge | Type | 6 mesh | 40 mesh | 100 mesh |
| 1 | 0.18 | Bentonite in gel form.[1] | 0 | 74 | 97 |
| 2 | 0.18 | ‒‒‒do.[1] | 3 | 73 | 97 |
| 3 | 0.92 | ‒‒‒do.[1] | 0 | 42 | 92 |
| 4 | 0.92 | ‒‒‒do.[1] | 0 | 60 | 98 |
| 5 | 0.18 | Dry bentonite | 0 | 64 | 97 |

[1] Bentonite gel was 10 weight percent bentonite in water.

Example II

Using the same charge to a laboratory stainless steel autoclave as in Example I, further quantities of tetraethyllead reaction masses were produced. These charges were fed in the same manner as the charges in Example I to the same laboratory still pot. The identical still procedures were used as in Example I except that a conventional still aid was used in lieu of the bentonite clay of Example I. The lead sludge was screened and the results of several runs made are listed in Table II.

TABLE II

| Run No. | Still aid | | Screen analysis (U.S. sieve)—Final lead sludge, cumulative, percent retained on screen of— | | |
|---|---|---|---|---|---|
| | Anhydrous wt. per 100 wt. sludge | Type | 6 mesh | 40 mesh | 100 mesh |
| 1 | 0.2 | Sodium thiosulfate | 60 | 98 | 100 |
| | 0.1 | $FeSO_4 \cdot 7H_2O$ | | | |
| 2 | 0.2 | Sodium thiosulfate | 100 | 100 | 100 |
| | 0.1 | $FeSO_4 \cdot 7H_2O$ | | | |

Run 1 was terminated after 38 minutes of steam still operation due to stilling of the agitator blade caused by an accumulation of large chunks of lead in the still. In Run 2 the sludge formed a large single cake that did permit the still operation to proceed to conclusion due to its configuration.

As can be readily seen, the agglomeration of lead is substantially reduced in the runs of Example I using the clay of the instant invention, while in Example II, a large portion of the lead sludge is retained on the 6 mesh screen.

While the invention has been described with reference to certain specific examples and illustrative embodiments, it is not, of course, intended to be limited thereby except insofar as appears in the accompanying claims.

I claim:

1. A method of dispersing lead particulates during the steam distillation of a reaction mass comprising tetraalkyllead, solid lead particulates, sodium halide and water comprising adding to the said reaction mass a montmorillonite clay in a quantity of at least .0001 pound of clay per pound of lead present in said mass and maintaining the concentration of the said clay during the steam distillation of the reaction mass between 0.0001 and about 0.01 pound per pound of lead present.

2. The method of claim 1 wherein the tetraalkyllead is tetraethyllead and the sodium halide is sodium chloride.

3. The method of claim 1 wherein the montmorillonite clay is bentonite clay.

4. The method of claim 2 wherein the montmorillonite clay is bentonite clay.

5. An improved method of recovering tetraalkyllead from a reaction mass produced by the reaction of sodium-lead alloy and alkyl halide, said mass containing tetraethyllead, sodium halide and metallic lead comprising contacting said mass with water, and subjecting the said mass and water to steam distillation in the presence of 0.0001 to about 0.01 pounds of montmorillonite clay per pound of lead to thereby recover the tetraalkyllead content of the mass while maintaining the lead particles dispersed in the water during the steam distillation.

6. The method of claim 5 wherein the tetraalkyllead is tetraethyllead, the alkyl halide is ethyl chloride and the sodium halide is sodium chloride.

7. The method of claim 5 wherein the clay is bentonite clay.

8. The method of claim 6 wherein the clay is bentonite clay.

9. A method of controlling the size of lead particulates present in a mixture comprising water, tetraalkyllead, alkali metal halide and particulate lead while said mixture is undergoing steam distillation to remove the tetraalkyllead therefrom comprising maintaining in the mixture during the steam distillation a montmorillonite clay content of 0.0001 to about 0.01 pound of clay per pound of lead present.

10. The method of claim 9 wherein the tetraalkyllead is tetraethyllead and the alkali metal halide is sodium chloride.

11. The method of claim 10 wherein the clay is bentonite clay.

References Cited
UNITED STATES PATENTS

| | | | |
|---|---|---|---|
| 2,004,160 | 6/1935 | Downing | 260—437 |
| 2,723,277 | 11/1955 | Rudy | 260—437 |
| 2,868,822 | 1/1959 | Mallison | 260—437 |
| 3,231,511 | 1/1966 | Closson | 260—437 |
| 2,407,262 | 9/1942 | Linch | 260—437 |

NORMAN YUDKOFF, Primary Examiner

S. SILVERBERG, Assistant Examiner

U.S. Cl. X.R.

203—96; 260—437 R